July 6, 1954 G. J. SALIBA ET AL 2,683,038

MAGNETIC TRANSDUCING UNIT

Filed Sept. 15, 1948 2 Sheets-Sheet 1

INVENTOR
GEORGE J. SALIBA
MORRIS M. GRUBER
BY James and Franklin
ATTORNEY

MAGNETIC TRANSDUCING UNIT

INVENTOR
GEORGE J. SALIBA
MORRIS M. GRUBER
BY James and Franklin
ATTORNEY

Patented July 6, 1954 2,683,038

UNITED STATES PATENT OFFICE 2,683,038

MAGNETIC TRANSDUCING UNIT

George J. Saliba, Englewood, N. J., and Morris M. Gruber, New York, N. Y., assignors to Presto Recording Corporation, Hackensack, N. J., a corporation of New York Application September 15, 1948, Serial No. 49,438

5 Claims. (Cl. 274—4)

This invention relates to a magnetic transducing unit, that is to say, a unit which is adapted to the recording and/or reproducing of sound through a magnetic transducing medium, and in particular to such a unit which employs a cylindrical shaped recording medium.

By the term "transducing" in this specification is meant the transformation of sound into an alteration of magnetic status of the suitable recording medium (recording) and/or the transformation of such varying magnetic status into sound (reproduction).

Transducing units operating on the magnetic principle have been known for some time. The transducing medium employed has taken a variety of forms. The most conventional recording media are in the form of magnetizable wires or tapes, and disc-like magnetic records have also been extensively employed. It has in the past been proposed to employ cylindrical magnetic transducing media of a type similar in shape to the early cylindrical gramaphone records but this type of recording medium has not met with acceptance because the cylindrical medium itself was of cumbersome and expensive construction and because no suitable transducing unit had been devised with which such a cylindrical transducing medium could be used.

Of prime importance in the design of such a transducing unit is the design of the transducing head employed therein. While various types of heads have been proposed for use with such cylindrical magnetic transducing media, none known to applicants have met the exacting requirements of precision use, and in particular none have achieved (1) accuracy of electric to magnetic transformation or vice versa, (2) ready conformability to the cylindrical transducing surface, (3) ready removability from that surface to permit interchanging of the cylindrical transducing media, (4) simple manual movability from one position on the magnetic transducing surface to another so as to selectively record, reproduce or erase any desired portion of the magnetic media, and (5) proper location of the erasing head with respect to the transducing head so as to ensure no magnetic interference between the two but effective operation of both.

The prime object of the present invention is to devise a transducing unit which will achieve the advantageous results set forth above with regard to the transducing head thereof.

Another object of the present invention is to devise a compact transducing unit adapted to employ cylindrical recording media and to cooperate therewith in a precision-like manner so as to record or reproduce the same and so as to permit the cylindrical transducing media to be readily interchangeable one with the other.

To the accomplishment of the foregoing objects and such other objects as may hereinafter appear, the present invention relates to the transducing unit and a cylindrical magnetic transducing medium employed therewith as defined in the appended claims and as set forth in this specification, taken together with the accompanying drawings, in which:

Figure 1:
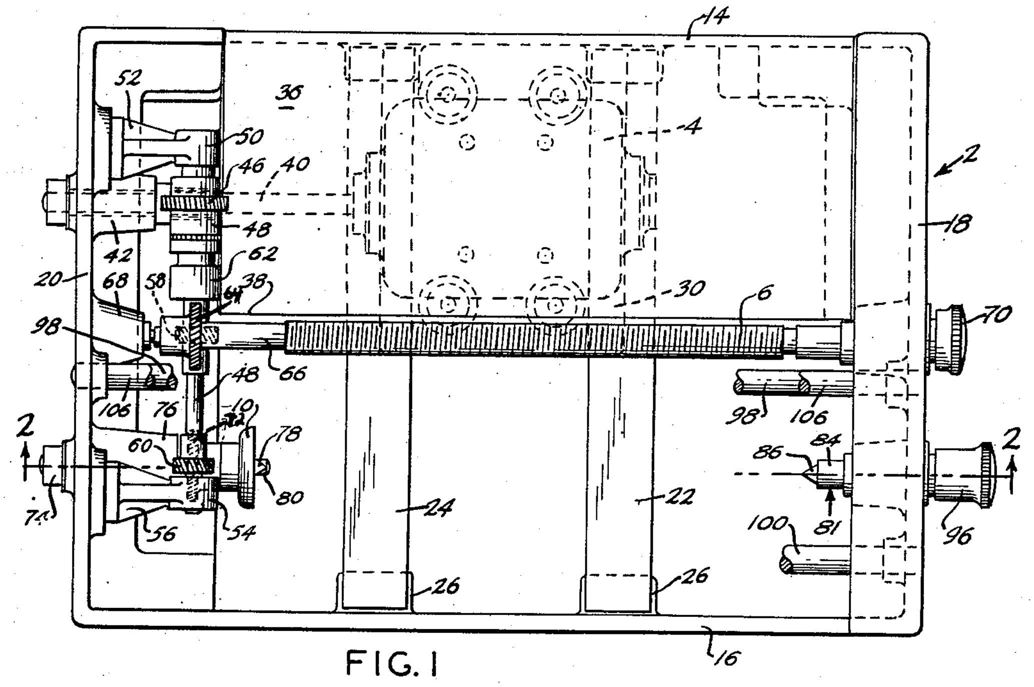
Fig. 1 is a top view of the transducing unit of the present invention, the cylindrical magnetic transducing medium and the transducing head being omitted therefrom.

The transducing unit of the present invention comprises a frame generally designated 2 on which is mounted a motor 4, the motor driving a rotatable feed element 6 for a transducing head generally designated 8 and also driving a combination centering and driving device 10 engageable with one end of a cylindrical transducing medium generally designated 12. As the transducing medium 12 is rotated, the transducing head 8 is moved across the magnetizable surface thereof preferably in a direction parallel to the axis thereof, the head 8 therefore magnetizing or cooperating with the magnetic status of the transducing unit 12 over a helical path.

The frame is provided with side walls 14 and 16 and end walls 18 and 20. Bars 22 and 24 extend between the side walls 14 and 16 supported by ledges 26 and the motor 4 is supported on said bars 22 and 24 via supporting plate 30 to which the motor is fastened by means of bolts 32 and washers 34 (see particularly Fig. 2). A roof 36, which may be an extension of and integrally formed with the side wall 14, may be provided to extend over the motor 4 and hide the same from view from above (see Fig. 1). This roof terminates at 38 short of the rotatable feed element 6 in order to expose the transducing head 8 and the transducing medium 12, so that they may be readily manipulated.

A shaft 40 is driven at one end by the motor 4 and has its other end journalled in side wall 20 at 42. A worm 44 is fastened thereto, the worm meshing with and driving worm wheel 46 attached to shaft 48 and journalled in bearing 50 fastened by means of bracket 52 to the side wall 20. The shaft 48 extends in a direction at right angles to the shaft 40 and has its other end journalled in bearing 54 attached to side wall 20 by means of bracket 56. The shaft 48 has attached thereto at positions appropriately spaced along its length a pair of hubbed gears 58 and 60. The shaft 48 may if desired be formed in a plurality of sections, these sections being joined by adjustable coupling 62.

The gear 58 meshes with and drives gear 64 which is in turn attached to shaft 66 one end of which is journalled in bearing 68 attached to side wall 20 and the other end of which is journalled in side wall 18 where it is joined with adjustment knob 70 which projects out past the side wall 18. The knob 70 rotates with the shaft 66 and is made accessible so that any given rotative position of the shaft 66 may be achieved independently of the motor 4. The shaft 66 carries the rotatable feed element 6, that element being here disclosed in the form of a helical feed screw the threaded portion of which defines a feed groove adapted to move the transducing head 8 across the transducing medium 12.

The gear 60 meshes with and drives gear 72 which is in turn fastened to stub shaft 74 mounted in bearing 76 in the side wall 20. The end of the shaft 74 opposite from the bearing 76 has attached thereto centering and driving unit 10, this unit being in the form of a disc having a tapered projection 78 axially disposed thereon and having a pin 80 projecting from its inner surface at a point radially disposed from the axial projection 78. As will become apparent hereinafter, the projection 78 is adapted to cooperate with the cylindrical magnetic transducing medium 12 so as to center the same and the pin 80 is adapted to cooperate with the transducing medium 12 so as to rotate the same. It will be apparent that inasmuch as the single drive shaft 48 simultaneously rotates both the feed element 6 for the transducing head 8 and, via the driving unit 10, the transducing medium 12, the transducing head will be caused to move across the surface of the transducing medium 12 in a direction parallel to that of the shaft 66 and consequently parallel to the axis of the transducing medium 12 while the transducing medium 12 is rotating about its own axis.

The transducing unit and centering unit 81 active to support the end of the transducing unit 12 opposite from that engageable with the centering and driving unit 10 is mounted in the side wall 18 opposite the centering and driving unit 10. This unit 81 comprises a plunger 82 the inner projecting end of which is provided with a portion 84 of increased diameter and a tapered projection 86 which is accurately positioned opposite the projection 78 so that a line drawn between the tips of the projections 78 and 86 will be parallel to the shaft 66 and the rotatable feed element 6 for the transducing head 8.

The plunger is slidable within bushing 88 press-fitted in bearing 90 in the side wall 18, a spring 92 being secured within the bushing and active upon the large diameter portion 84 of the plunger 82 so as to urge the same inwardly. The outer projecting end 94 of the plunger 82 is fastened to pull knob 96, the knob serving to limit inward motion of the plunger 82 and to provide a manual means for moving the plunger outwardly, i. e., to the right as viewed in Fig. 2, when interchanging the transducing media 12.

Figure 3:
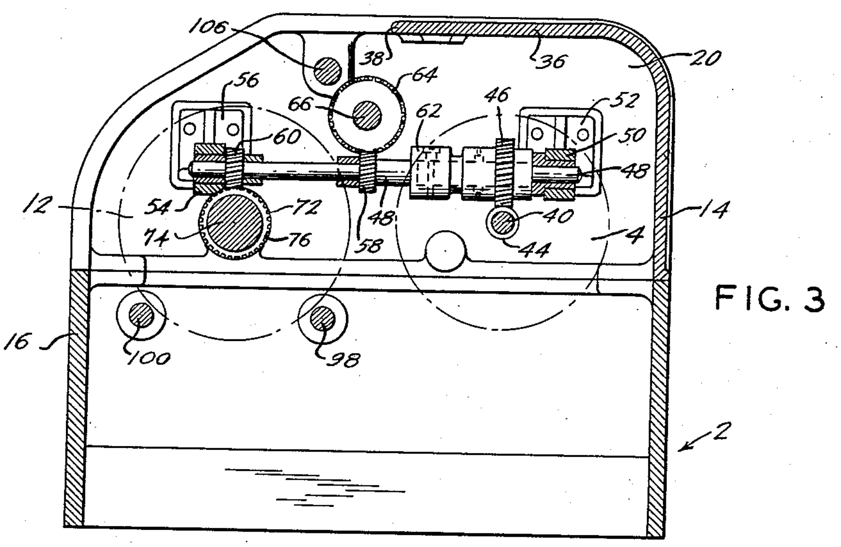
Fig. 3 is an end cross-sectional view taken along the line 3—3 of Fig. 2, the positions of the motor and the transducing medium being shown in broken lines.

A pair of rods 98 and 100 are secured between the side walls 18 and 20 and beneath the cylindrical transducing medium 12, the spacing being such that when the transducing medium 12 is properly mounted on and between the centering and driving unit 10 and the centering unit 81, there will be a slight but definite clearance between the transducing medium 12 and the rods 98 and 100 (see Fig. 3) so that the transducing medium, when rotated, will be rotatable free of frictional retardation. However, it is desirable that the rods 98 and 100 be placed very close to a position in which they will make contact with the mounted transducing medium 12 so that should the medium 12 be accidentally disengaged from its centering and driving units, or should those units be improperly engaged with the medium 12, the medium 12 will nevertheless be retained in a close to operative position, thus preventing accidental dropping of the medium 12. Moreover, if the medium 12 be initially placed upon the rods 98 and 100, the latter define a support for the unmounted medium 12 which places that medium in a position closely adjacent to its proper mounted position, thus facilitating engagement between the medium 12 and its cooperating centering and driving units 10 and 81.

Figures 4, 5:
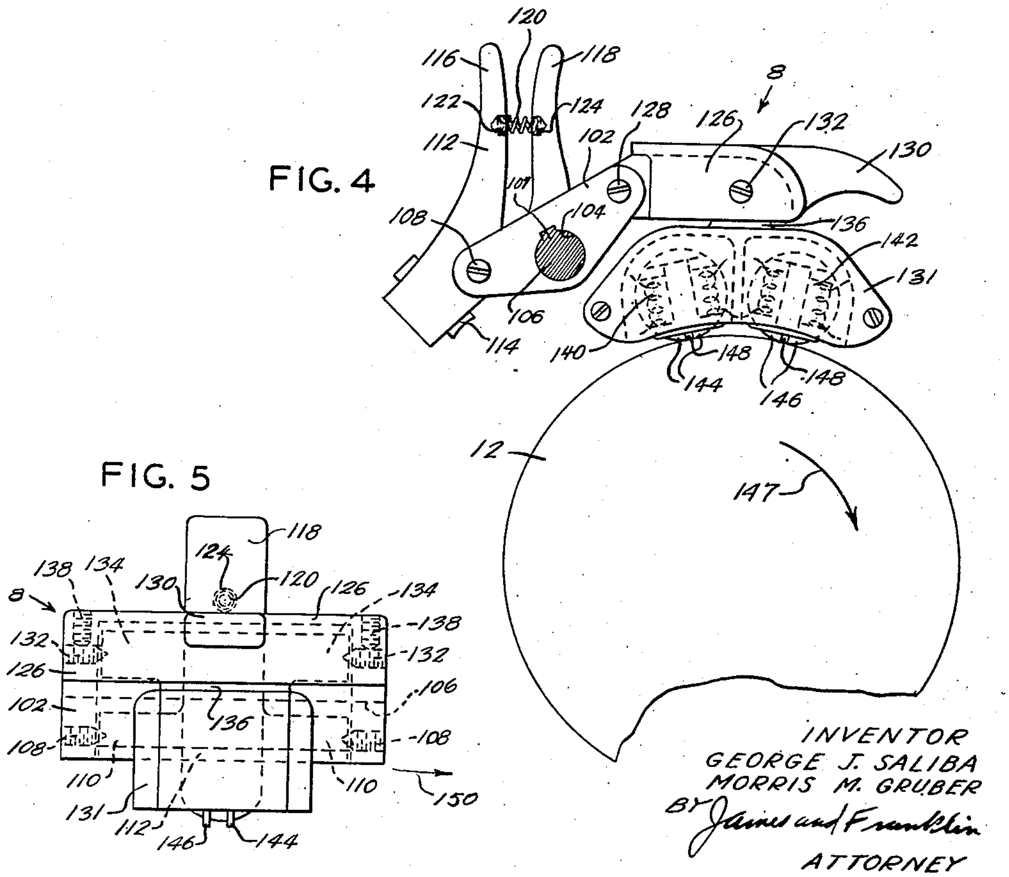
Fig. 4 is a side view on an enlarged scale of the transducing head construction of the unit showing that head in transducing position on the cylindrical magnetic transducing medium.
Fig. 5 is a view showing the transducing head in front elevation on an enlarged scale.

The transducing head of the instant transducing unit (see Figs. 2, 4, and 5) presents many desirable constructional features. This unit comprises a body 102, here shown as roughly triangular in cross-section, which is provided with an aperture 104 through which rod 106 passes, at least a portion of the shaft 106 being keyed, as at 107, to prevent the body 102 from rotating thereon, the body 102 being slidable over the shaft 106 and the shaft 106 thereby defining a support for the body 102 along which that body is movable. Articulately attached to the body 102 by means of pins 108 engageable with trunnions 110 is a feed groove engaging member 112 carrying at one end a knife edge 114 adapted to fit into the helical feed groove or screw thread in the feed screw 6. The other end of the groove engaging member 112 is provided with a finger piece 116 and the body 102 is provided with a cooperating opposing finger piece 118. A spring 120 is housed within recesses 122 and 124 in the finger pieces 116 and 118 respectively, the spring 120 being maintained under compression so as to urge the two finger pieces 116 and 118 apart, thus tending to rotate the groove engaging member 112 in a counter-clockwise direction as viewed in Fig. 4 so as to cause the knife edge 114 to engage with the feed screw 6. It will be apparent that when this normal condition obtains, rotation of the feed screw 6 will cause the knife edge 114 to move along the axis of the screw 6 and since the body 102 is slidable on the shaft 106, the body 102 will be correspondingly moved. Thus, accurate control of the translation of the body 102 is achieved, this control being just as fine and accurate as the cutting of the feed screw 6. It will also be clear that by pressure applied to the finger pieces 116 and 118 in a direction to compress the spring 120, the groove engaging member 112 will be rotated in a clockwise direction as viewed in Fig. 4, thus disengaging the knife edge 114 from the feed screw 6, thereby permitting the body 102 to be manually slid along the shaft 106 to any desired position. By this simple structure, the transducing head 8, which is attached to the body 102, is either fed along the surface of the transducing medium 12 by the feed screw 6 so that its pole pieces trace a helical path thereover, or the transducing head 8 may be manually positioned at any appropriate and desired point along the length of the transducing medium 12.

Since the surface of the medium 12 is cylindrical, and since it is essential, for clarity and fidelity of reproduction and recordation, that the magnetic heads, and particularly the pole pieces thereof, be accurately positioned with respect to the transducing cylinder 12, the manner of connecting the head 8 to the body 102 which is moved by the feed screw is of considerable importance. The present invention has combined this manner of connection with the particular construction of the head 8 so as to achieve the desirable advantages set forth at the beginning of this specification.

A linking element 126 is pivotally attached to the body 102 by means of pins 128, the element 126 extending over the transducing cylinder 12 and being provided with a projecting finger piece 130. The transducing head housing 131 is pendulously mounted from the linking element 126, the pins 132 in the linking element 126 cooperating with trunnions 134 which may be integral with the housing 131 and connected thereto by means of neck 136 which passes up into the linking element 126. Set screws 138 may be provided to secure the pins 132 in position and similar set screws may be employed with the pins 108 and 128 as well.

The housing 131 contains within itself a pair of magnetic units, one defining an erasing head 140 and the other defining a transducing, or recording and reproducing head 142. Each of these heads contains a pair of pole pieces 144 and 146 respectively, an air gap 148 being provided between each of the pole piece pairs. The tips of the pole pieces 144 and 146 project below the head structure 8 so as to be either directly engageable with the surface of the transducing medium 12, or to be positionable a fixed distance therefrom. It has been found to be most desirable to have these two pair of pole pieces 144 and 146 equidistant from the magnetizable surface of the transducing medium 12. It is also necessary that the pole pieces 144 and 146 be spaced from one another sufficiently so that the magnetic effect of one will not unfavorably affect the magnetic effect of the other. Moreover, particularly during recording, it is essential that the pole pieces 144 of the erasing head 140 traverse a particular segment of the magnetizable surface before that segment is traversed by the pole pieces 146 of the transducing head 142 since all prior recordings must be erased before the new recording is magnetically placed thereon. The illustrated construction involves a spacing and positioning of the heads 140 and 142 together with their respective pole pieces 144 and 146 in order to achieve the above results.

The projecting tips of the pole pieces 144 and 146 are spaced from one another in two directions. As may be seen in Fig. 4, the pole pieces are spaced in the direction of rotation of the cylindrical transducing medium, this direction being indicated by the arrow 147. In this regard it is preferable that the erasing head 140 be positioned in advance of the transducing head 142 so that the erasing head 140 will be active upon each segment of the transducing medium before the transducing head 142. In order to ensure adequate spacing between the two heads, the pole pieces 144 are also spaced from the pole pieces 146 in the direction of motion of the body 102. As may be best seen in Figs. 2 and 5, the body 102 and the transducing head 8 of which it is a part, are adapted to move in the direction of the arrow 150. Consequently, the projecting tips of the pole pieces 144 of the erasing head 140 are positioned in advance of the projecting tips of the pole pieces 146 of the transducing head 142. It will, of course, be obvious that the amount of this spacing may be varied within considerable limits, it being necessary only that the spacing be so related to the pitch of the feed groove in the feed screw 6 that a portion of the magnetizable surface of the transducing medium 12 to be traversed by the pole pieces 144 will also be traversed by the pole pieces 146 and that the spacing be suficient so that deleterious magnetic interaction between the pole pieces 144 and 146 be avoided.

In order to permit the pole pieces 144 and 146 to be equidistantly positioned with regard to the magnetizable surface of the transducing medium 12, they are positioned along an arc of said magnetizable surface. The pendulous articulate mounting of the head housing 131 from the linking element 126 permits accurate conformability of the pole pieces 144 and 146 to the cylinder 12. The articulate mounting of the linking element 126 on the body 102 permits that element and the head structure 8 to be bodily raised from the transducing medium 12 so as to facilitate the replacement of said medium. In this regard it should be noted that the finger piece 130, shown on the linking element 126, might equally well be placed on the housing 131.

Figure 2:
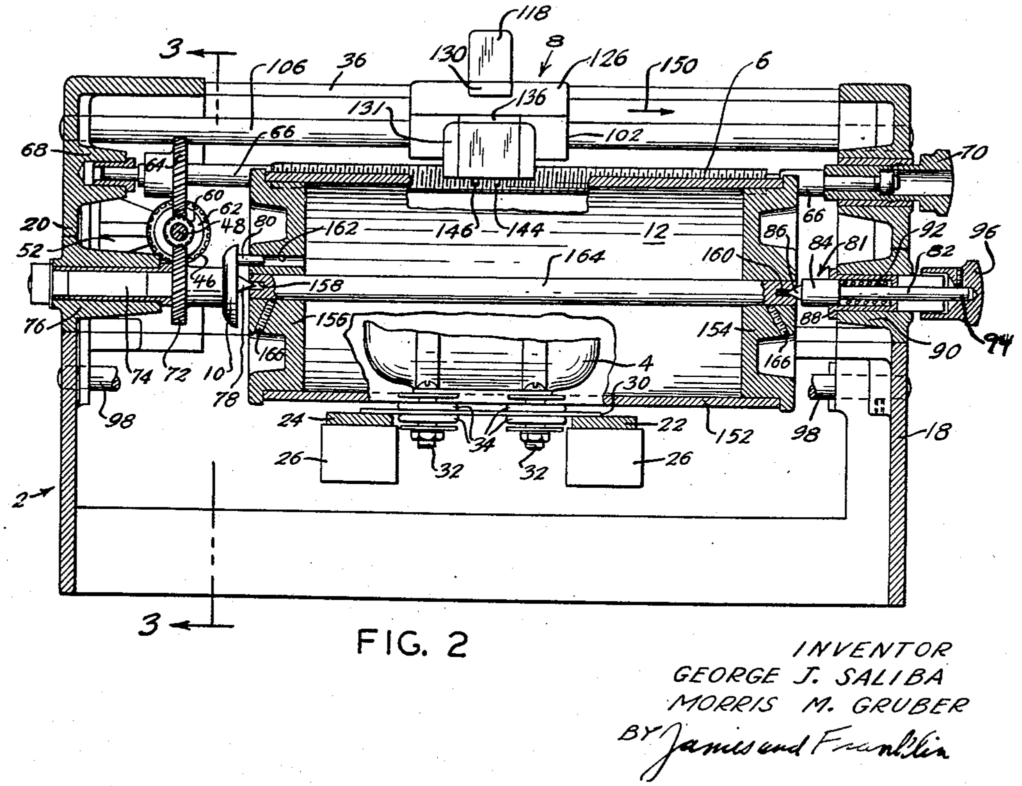
Fig. 2 is a side cross-sectional view taken along the line 2—2 of Fig. 1 but showing a cylindrical transducing medium and head, portions of said transducing medium being broken away to expose said head, and the rotative mounting for the feed means also being shown in cross-section.

The magnetic transducing medium 12 itself is best illustrated in Fig. 2. It comprises an open-ended cylindrical structural frame 152 which may either itself be of magnetizable material or which may be of any suitable structural material having a magnetizable coating thereon. A pair of plugs 154 and 156 are provided to close the open ends of the cylindrical structure 152 and each of these plugs are provided, at points accurately corresponding to the central axis of the cylinder, with recesses 158 and 160 cooperating respectively with the projections 78 and 86 on the centering and driving unit 10 and the centering unit 81 respectively. One of tht plugs, here shown as 156, has an additional aperture 162, radially spaced from the aperture 158 and adapted to receive the pin 80 of the centering and driving unit 10.

As disclosed in Fig. 2, accurate centering of the transducing unit 12 is achieved together with structural rigidification thereof and particularly rigidification with regard to the inwardly directed forces exerted by the projections 78 and 86, by shaft 164, which extends between and projects through the plugs 154 and 156, being retained in rigid connection therewith by means of set screws 166, the shaft 164 being provided with precision located recesses 158 and 160. By means of this construction, fabrication of the various component parts of the transducing medium 12 is facilitated, and the shaft 164, preferably of steel or other structural metal, takes and successfully resists all of the compressive forces exerted by the spring 92, thus permitting the cylindrical surface of the structural frame 152 to maintain its true structural shape free of pressure-induced distortions.

The operation of the transducing unit here disclosed will in the main be apparent from the above structural description. When a cylinder 12 is to be inserted into the device, the finger piece 130 on the linking element 126 is lifted so as to move the head housing 131 out of the way, the cylinder 12 is placed on the rods 98 and 100, the button 96 is withdrawn so as to move the plunger 82 and the projection 86 outwardly, and the opposite end of the cylinder 12 is lifted and rotated so that the pin 80 is received within the recess 162 and the projection 78 is received within the recess 158. The button 96 is then released and the cylinder 12 is adjusted until the projection 86 is received within the recess 160. The head housing 131 is then lowered until the pole piece tips 144 and 146 make contact with the magnetizable surface of the cylinder 12, the connection of the housing 131 to the body 102 easily permitting conformance of the pole piece tips 144 and 146 to said magnetizable surface. The finger pieces 116 and 118 are compressed so as to disengage the knife edge 114 from the feed screw 6 and the head is then positioned at any desired point along the magnetizable medium. The motor is then started so that the cylinder 12 is rotated and the head 8 is fed along the length of the cylinder, the pole pieces 144 and 146 describing a helical path thereover, so as to either record or reproduce along said helical path. The electric and magnetic circuits involved in this recording and reproducing may take any one of a number of well known forms and constitute no part of the present invention.

If reproduction of only a portion of the recording is to be repeated, it is necessary merely to compress the finger pieces 116 and 118 and slide the body 102 along the shaft 106 to the desired position. It is preferable, before performing this operation, if the pole pieces 144 and 146 are in direct contact with the cylinder 12, to lift them therefrom by means of the finger piece 130 in order to eliminate frictional forces thereon which might tend either to break the pole pieces 144 and 146 or to mar the magnetizable surface of the cylinder.

Other modes of manipulation of the apparatus will suggest themselves.

By the construction above described, there has been provided a transducing unit capable of efficiently and accurately employing a cylindrical magnetic transducing medium and an improved construction of said transducing medium has also been disclosed. While only one embodiment of this invention has been here disclosed, it will be apparent that many changes may be made in its construction without departing from the spirit of the invention as defined in the appended claims.

We claim:

1. A magnetic transducing head structure for use with a cylindrical magnetic recording medium comprising a body movable in the direction of the axis of the recording medium and having an aperture for receiving a support along which said body is movable, a pole piece housing articulately attached to said body by means of a linkage having a plurality of pivots extending collaterally of the axis of the recording medium so as to be conformable to the surface of said recording medium, a finger piece for moving said housing toward and away from said recording medium, and a transducing head and an erasing head in said housing, said heads having pole pieces spaced from one another in the direction of the axial motion of said body, said erasing head pole piece being advanced in the direction of motion of said body with respect to said transducing head pole piece.

2. A magnetic transducing head structure for use with a cylindrical magnetic recording medium comprising a body movable in the direction of the axis of the recording medium and having an aperture for receiving a support along which said body is movable, a pole piece housing articulately attached to said body by means of a linkage having a plurality of pivots extending collaterally of the axis of the recording medium so as to be conformable to the surface of said recording medium, a finger piece for moving said housing toward and away from said recording medium, and a transducing head and an erasing head in said housing, said heads having pole pieces spaced from one another in the direction of rotation of said cylindrical transducing medium, and also spaced from one another in the direction of the axial motion of said body, said erasing head pole piece being advanced in the direction of motion of said body with respect to said transducing head pole piece.

3. A magnetic transducing head structure for use with a cylindrical magnetic recording medium comprising a body movable in the direction of the axis of the recording medium and having an aperture for receiving a support along which said body is movable, a pole piece housing articulately attached to said body by means of a linkage having a plurality of pivots extending collaterally of the axis of the recording medium so as to be conformable to the surface of said recording medium, a finger piece for moving said housing toward and away from said recording medium, and a transducing head and an erasing head in said housing, said heads having pole pieces and said pole pieces having tips which engage said recording medium, said tips being spaced from one another in the direction of rotation of said cylindrical transducing medium and also spaced from one another in the direction of the axial motion of said body, said erasing tip being advanced in the direction of motion of said body with respect to said transducing tip.

4. A magnetic transducing head structure for use with a cylindrical magnetic recording medium comprising a body disposed over the recording medium and movable in the direction of the axis of rotation of the recording medium, a linking member pivotally mounted on said body and extending over said cylindrical recording medium in a direction transverse to the axis of the recording medium, a pole piece housing pendulously mounted on said linking member on an axis extending in the direction of the axis of the recording medium, said housing carrying a transducing head and an erasing head, said heads having pole pieces the tips of which are adapted to be positionable closely adjacent to the cylindrical recording surface and which are spaced from one another around the periphery of the recording medium, said pole pieces being spaced from one another in the direction of the axial motion of said body, with said erasing head pole piece being advanced in the direction of motion of said body with respect to the said transducing head pole piece, and an outwardly projecting finger piece on said linking member located over said recording medium and said housing for ready accessability for moving said housing toward and away from said recording medium, the mounting being such that said pole pieces are permitted to freely conform to said cylindrical recording surface when positioned closely adjacent thereto.

5. A magnetic transducing head structure for use with a cylindrical magnetic recording medium comprising a body disposed over the recording medium and movable in the direction of the axis of rotation of the recording medium, a linking member pivotally mounted on said body and extending over said cylindrical recording medium in a direction transverse to the axis of the recording medium, a pole piece housing pendulously mounted on said linking member on an axis extending in the direction of the axis of the recording medium, said housing carrying a transducing head and an erasing head, said heads having pole pieces the tips of which are adapted to be positionable closely adjacent to the cylindrical recording surface and which are spaced from one another around the periphery of the recording medium, said pole pieces being spaced from one another in the direction of rotation of said cylindrical recording medium and spaced from one another in the direction of the axial motion of said body, said erasing head pole piece being advanced in the direction of rotation and in the direction of motion of said body with respect to said transducing head pole piece, and an outwardly projecting finger piece on said linking member located over said recording medium and said housing for ready accessability for moving said housing toward and away from said recording medium, the mounting being such that said pole pieces are permitted to freely conform to said cylindrical recording surface when positioned closely adjacent thereto.

References Cited in the file of this patent

UNITED STATES PATENTS

| Number | Name | Date |
|---|---|---|
| 511,402 | Bruening | Dec. 26, 1893 |
| 661,619 | Poulsen | Nov. 13, 1900 |
| 746,609 | Vogel | Dec. 8, 1903 |
| 760,655 | Solon | May 24, 1904 |
| 819,670 | Pedersen | May 1, 1906 |
| 898,283 | Stuart | Sept. 8, 1908 |
| 1,049,237 | Holland | Dec. 31, 1912 |
| 1,100,024 | MacDonald | June 16, 1914 |
| 1,754,454 | Bodine | Apr. 15, 1930 |
| 1,785,409 | Frykman | Dec. 16, 1930 |
| 1,973,081 | Keiser | Sept. 11, 1934 |
| 2,220,626 | Somers et al. | Nov. 5, 1940 |
| 2,229,293 | Huntley et al. | Jan. 21, 1941 |
| 2,279,227 | Dunning et al. | Apr. 7, 1942 |
| 2,530,029 | Pond | Nov. 14, 1950 |
| 2,538,452 | Harrington | Jan. 16, 1951 |
| 2,548,831 | Trevitt et al. | Apr. 10, 1951 |
| 2,573,303 | Bozoky | Oct. 30, 1951 |

FOREIGN PATENTS

| Number | Country | Date |
|---|---|---|
| 394,884 | Germany | May 12, 1924 |